United States Patent
Thabet et al.

(10) Patent No.: US 9,513,973 B2
(45) Date of Patent: Dec. 6, 2016

(54) DEVICE AND METHOD FOR SYNCHRONIZING TASKS EXECUTED IN PARALLEL ON A PLATFORM COMPRISING SEVERAL CALCULATION UNITS

(75) Inventors: Farhat Thabet, Gif sur Yvette (FR); Yves Lhuillier, Palaiseau (FR); Raphael David, Bures sur Yvette (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 170 days.

(21) Appl. No.: 14/129,895

(22) PCT Filed: Jun. 25, 2012

(86) PCT No.: PCT/EP2012/062249
§ 371 (c)(1),
(2), (4) Date: Jun. 5, 2014

(87) PCT Pub. No.: WO2013/000867
PCT Pub. Date: Jan. 3, 2013

(65) Prior Publication Data
US 2014/0380327 A1 Dec. 25, 2014

(30) Foreign Application Priority Data
Jun. 29, 2011 (FR) .................... 11 55835

(51) Int. Cl.
*G06F 9/46* (2006.01)
*G06F 9/52* (2006.01)
*G06F 9/50* (2006.01)
*G06F 9/48* (2006.01)

(52) U.S. Cl.
CPC . *G06F 9/52* (2013.01); *G06F 9/50* (2013.01); *G06F 9/522* (2013.01); *G06F 9/4881* (2013.01)

(58) Field of Classification Search
CPC .......... G06F 9/52; G06F 9/4881; G06F 9/522; G06F 9/50
See application file for complete search history.

(56) References Cited

U.S. PATENT DOCUMENTS

| | | | |
|---|---|---|---|
| 2003/0142639 A1* | 7/2003 | Cheung ............... | H04B 1/707 370/321 |
| 2003/0177163 A1* | 9/2003 | Nomura ............. | G06F 11/3419 718/102 |
| 2004/0123298 A1* | 6/2004 | Shebanow ........... | G06F 9/3836 718/104 |
| 2007/0022423 A1* | 1/2007 | Bril .................... | G06F 9/4843 718/102 |
| 2015/0103084 A1* | 4/2015 | Nalluri ................ | G06T 1/20 345/522 |

OTHER PUBLICATIONS

EP 1544734, Siemens Aktiengesellschaft, Dec. 2003.*
Steven L. Scott, "Synchronization and Communication in the T3E Multiprocessor", ASPLOS-VII, Sep. 1996, pp. 26-36.
M. Ojail et al., "Synchronous Reactive Fine Grain Tasks Management for Homogeneous Many-Core Architectures", German National Library of Science and Technology (TIB), pp. 144-149.
"Platform 2012: A Many-Core Programmable Accelerator for Ultra-Efficient Embedded Computing in Nanometer Technology", STMicroelectronics and CEA, Nov. 2010, pp. 1-26.
G. Seguin, "Multi-Core Parallelism for NS-3 Simulator", Internship at INRIA Sophia-Antipolis, PLANETE Team, Jun. 2009, p. 1-15.

* cited by examiner

*Primary Examiner* — Camquy Truong
(74) *Attorney, Agent, or Firm* — Baker & Hostetler LLP

(57) ABSTRACT

A device and method for synchronizing tasks executed in parallel on a platform comprising comprises several computation units. The tasks are apt to be preempted by the operating system of the platform, and the device comprises at least one register and one recording module installed in the form of circuits on said platform, said recording module being suitable for storing a relationship between a condition to be satisfied regarding the value recorded by one of said registers and one or more computation tasks, the device comprising a dynamic allocation module installed in the form of circuits on the platform and configured to choose a computation unit from among computation units of the platform when said condition is fulfilled, and for launching the execution on the chosen computation unit of a software function for searching for the tasks on standby awaiting the fulfillment of the condition and notifications of said tasks.

16 Claims, 2 Drawing Sheets

DEVICE AND METHOD FOR SYNCHRONIZING TASKS EXECUTED IN PARALLEL ON A PLATFORM COMPRISING SEVERAL CALCULATION UNITS

CROSS-REFERENCE TO RELATED APPLICATIONS

This application is a National Stage of International patent application PCT/EP2012/062249, filed on Jun. 25, 2012, which claims priority to foreign French patent application No. FR 1155835, filed on Jun. 29, 2011, the disclosures of which are incorporated by reference in their entirety.

FIELD OF THE INVENTION

The present invention relates to a device and method for synchronizing tasks executed in parallel on a platform comprising several computation units. It applies notably to onboard platforms suited to real-time operation.

BACKGROUND

With the development of complex and diversified applications executed on multi-core mobile platforms, the need for parallelism in terms of computation and memory access is growing incessantly. Indeed, to satisfy demanding execution constraints of certain platforms such as real-time systems for example, the execution of an application is split up into several processing blocks called tasks. This splitting makes it possible, by mobilizing several computation resources (cores, processors for example) in parallel, to reduce the computation time required for the execution of the application.

Nonetheless, memory sharing and the necessary coordination of the execution of the tasks require means for mutual synchronization of the tasks. In order to ensure effective parallelism in the execution of several tasks on one and the same platform, it is necessary to have efficient synchronization means, synchronization generally constituting the main bottleneck of shared-memory systems. Indeed, when the number of applications executed in parallel and the quantity of shared memory increase, then the time mobilized for synchronization management may increase so much as to be detrimental to the general performance of the system, notably because of polling effects, stated otherwise active standby, on account for example of the permanent polling of one or more shared variables.

An example of a difficulty occurring in the known systems is given hereinafter with regard to FIG. 1, for the implementation of a synchronization barrier, a procedure often used to create a synchronization point. For example, in an onboard system, a complex computation can be split into several less complex, parallel tasks 101, 102, 103, 104, 105. The partial results 110 obtained by the various tasks can be collected so as to carry out another computation through other tasks. The collection point 120 for various intermediate results represents a synchronization barrier. Synchronization barriers represent one of the procedures most used in parallel architectures for implementing this type of synchronization point. A task may finish its computation before the others, but it must wait for the end of all the tasks that participate in the barrier. Once all the tasks have crossed the barrier 120, they are notified and their execution is continued.

The difficulty of implementing such synchronization resides notably in the manner of managing the barrier initialization phase, the standby phase waiting for tasks that finish their computation before the others and especially notification of the end of standby. Most solutions use shared variables polled concurrently by the tasks which participate in the associated barrier. As soon as the number of tasks increases, performance degradation problems are noted. These problems are generally related to network overload and to the competing (polling) of various tasks for access to the variables associated with this kind of synchronization point. Moreover, in a dynamic operating mode, tasks which participate in a barrier may be preempted by the system for a given reason (e.g. priority). This kind of scenario can be frequent in today's onboard systems, which integrate more and more computational parallelism for more complex applications. The expression preemption of a task is intended to mean the action of the system which consists in suspending the execution of a task and dissociating it from its computation unit. When the execution of the task is resumed, the task is again associated with a computation unit (not necessarily the same as that associated before the preemption). The suspension of a task may be caused by the task itself. In general, one speaks of preemption only when the task is suspended by the system. However, subsequently, we shall speak of a preempted task to designate any task which is no longer currently executing and which is no longer associated with a computation unit.

Several known techniques make it possible to manage the concurrent access of several tasks to shared resources and to create synchronization points between several tasks (for example a synchronization barrier).

A first approach encompasses the software procedures. The latter ensure the synchronization of several tasks and mutually exclusive access to resources by using software means alone. These procedures may simply consist of a shared boolean variable indicating the status of a token: free or taken. A test loop for this variable is introduced into the code of the concurrent tasks and each task must execute this loop repeatedly until the token is obtained, before being able to access a shared resource. The token becomes free when the task which possesses it changes its state from "taken" to "free". This type of procedure, sometimes called "Test-and-Set", is rather inefficient, notably because of the contention phenomena that it causes. Indeed, all the tasks which attempt to obtain the token dispatch access requests at the same time and for one and the same memory location. These simultaneous requests give rise to rapid degradation in performance, not only at the level of the memory in which the token is stored, but also at the level of the connection network which ensures communication between the various hardware modules of the system. To reduce contention due to the phenomenon of active standby, several procedures have been proposed: the introduction of a test prior to the execution of the "Test-And-Set" instruction so as to avoid the systematic execution of the latter (a procedure sometimes designated by the name "Test-And-Test-And-Set"), the insertion of a lag between two successive access requests dispatched by each task, the use of tickets and/or of specific standby queues for each resource accessible concurrently. These procedures make it possible to limit the penalty in terms of execution latency introduced for certain basic synchronization mechanisms, but they reach their limits as soon as the number of processors increases appreciably. Moreover, in a dynamic operating context where the tasks can be placed on standby, preempted or migrated at any moment, while standing by waiting for a token to be obtained for example, the synchronization task becomes more complicated, since no physical resource is on active standby awaiting the event.

A second approach encompasses the hardware procedures. In order to avoid the execution latencies introduced by the software approaches, certain techniques propose to install the synchronization techniques hardware-wise. For example, according to a first technique, a network of connections dedicated solely to the synchronization operations is effected in addition to the customary networks for data transport and control. According to a second technique, certain synchronization mechanisms (such as barriers or mutexes) are implemented with logical operators (AND, OR, . . . etc.) connected together directly with physical connections. However, the hardware infrastructure used to implement the synchronization functions is generally expensive in terms of circuit area and rather inflexible, and therefore rather unsuited to the dynamic aspect of a system, notably in the distributing of the computation load over the various computation units.

A third approach encompasses the mixed software and hardware procedures. Notably, the AMO ("Activates Memory Operation") technique moves certain computation operations, generally implemented processor side, to memory side so as to reduce the cost of interaction between these two elements. For example, Cray T3E provides a set of atomic operations implemented hardware-wise as "fetch&increment" and "compare&swap", as described in the article by S. L. Scott "Synchronization and communication in the T3E multiprocessor", published in ASPLOS-VII in September 1996. A second mixed technique, called TM for "Tagged Memory", adds a bit to each data word stored in memory as latching flag for the synchronization. This technique allows fine-grain synchronization management, but it gives rise to a non-negligible cost overhead in terms of silicon area. A third mixed technique called LCU ("Lock Control Unit") makes it possible to support preemption and migration of tasks for certain synchronization mechanisms. However, this technique requires a specific module per computation unit and this may entail a non-negligible cost overhead in terms of circuit area, in a hierarchical system with several multi-core clusters for example. Moreover, this LCU technique relies on transmissions of synchronization messages between these modules, and this may give rise to contention phenomena, in particular when the number of tasks and/or computation cores increases in dynamic operating mode, that is to say in an operating mode in which the tasks can be preempted and/or migrated.

SUMMARY OF THE INVENTION

An aim of the invention is to synchronize tasks executed in parallel on a multi-processor system while avoiding contention effects that are penalizing in terms of performance and while preserving sufficient flexibility to adapt to systems having a dynamic operating mode (preemption and migration of tasks). For this purpose, the subject of the invention is a device for synchronizing tasks executed in parallel on a platform comprising several computation units, the tasks being apt to be preempted by the operating system of the platform, the device being characterized in that it comprises at least one register and one recording module which are installed in the form of circuits on said platform, said recording module being suitable for storing a relationship between a condition to be satisfied regarding the value recorded by one of said registers and one or more computation tasks, the device comprising a dynamic allocation module installed in the form of circuits on the platform and configured to choose a computation unit from among the computation units of the platform when said condition is fulfilled, and for launching the execution on the chosen computation unit of a software function for searching for the tasks on standby awaiting the fulfillment of the condition and for notifying said tasks.

The stored relationship between the register and the computation tasks can be a lookup table of correspondence between an identifier of said register and a set of identifiers of said computation tasks to be notified. For example, the software function for searching and updating the state of the tasks signals to the tasks relevant to the fulfillment of the condition, that the condition is indeed fulfilled. The tasks can for example be retrieved by virtue of lookup tables of correspondences maintained by the system between identifiers of registers, identifiers of computation units, and identifiers of tasks.

In contradistinction to conventional systems in which a computation resource is generally designated arbitrarily to search for the task preempted by software (thereby risking interrupting an ongoing computation), a computation resource appropriate for execution being allocated subsequently. With the device according to the invention, the hardware module for dynamic allocation designates, in advance, the most available computation resource possible to search for the task. Furthermore, in the majority of cases, the designated resource is the most appropriate for execution, since by construction, this resource is the most available.

According to one embodiment of the device according to the invention, the device comprising a notification module configured to detect the fulfillment of said condition and to signal the fulfillment of said condition to the non-preempted tasks in relation to said condition when the fulfillment of said condition is detected.

According to one embodiment of the device according to the invention, the signaling is carried out by sending an asynchronous signal to the computation units executing said non-preempted tasks on standby awaiting the condition, said signal being sent to the computation units by means of a lookup table of correspondence between computation units and conditions, this lookup table being updated continuously by the operating system of the platform.

The device according to the invention makes it possible to lighten the load supported by the computation units, the notification module handling the polling of the fulfillment of the condition. Advantageously, the notification module tests whether the condition is fulfilled after each modification of the register value on which this condition is defined.

According to one embodiment of the device according to the invention, the register supports atomic operations of post-incrementation and/or post-decrementation, suitable for reading the value recorded by the register and then for modifying it within one and the same atomic operation during read-access to a memory slot, related to said register. The presence of these functionalities makes it possible to improve performance when using the register as a counter.

The subject of the invention is also a method for synchronizing tasks executed in parallel on a platform comprising several computation units and a hardware synchronization device comprising at least one register and one dynamic allocation module, a task on standby awaiting the satisfaction of a condition being preempted by the operating system of said platform, the method being characterized in that when said condition is fulfilled, the dynamic allocation module chooses a computation unit to execute a software function configured to search for the tasks on standby awaiting the fulfillment of the condition and to notify said tasks.

According to an implementation of the method for synchronizing tasks according to the invention, the dynamic allocation module is configured to choose the computation unit as a function of at least one criterion from among the following: the computation load allotted to each of the computation units of the platform, the operating state of each of the computation units of the platform, a priority level allotted a priori to each of the computation units of the platform.

According to an implementation of the method for synchronizing tasks according to the invention, when a condition is fulfilled, the dynamic allocation module causes an interrupt on the computation unit chosen to execute said software function for searching for and for updating the state of the tasks.

According to an implementation of the method for synchronizing tasks according to the invention, the dynamic allocation module transmits, as input parameter of said software function, a datum making it possible to identify the register on which the fulfilled condition is defined.

According to an implementation of the method for synchronizing tasks according to the invention, when a task is preempted, a preemption indicator is activated for the condition or conditions whose fulfillment is awaited by said task, the dynamic allocation module being activated when the preemption indicator is activated and when the condition is fulfilled.

According to an implementation of the method for synchronizing tasks according to the invention, when a task resumes its execution on a computation unit, the preemption indicator is deactivated if there no longer exists any preempted task associated with the condition.

According to an implementation of the method for synchronizing tasks according to the invention, said task modifying the value of said register modifies the value of this register when a resource is freed by said task. The freed resource is for example a memory space.

The synchronization method according to the invention can comprise a step of recording said relationship between the condition to be satisfied and the computation units during the execution of a task comprising a phase of awaiting an asynchronous signal. The device therefore makes it possible to operate in two phases: a phase of recording by a task having to be notified, and a phase of detection and notification.

BRIEF DESCRIPTION OF THE DRAWINGS

Other characteristics will become apparent on reading the detailed nonlimiting description given by way of example which follows with regard to appended drawings which represent.

DETAILED DESCRIPTION

Figure 2:
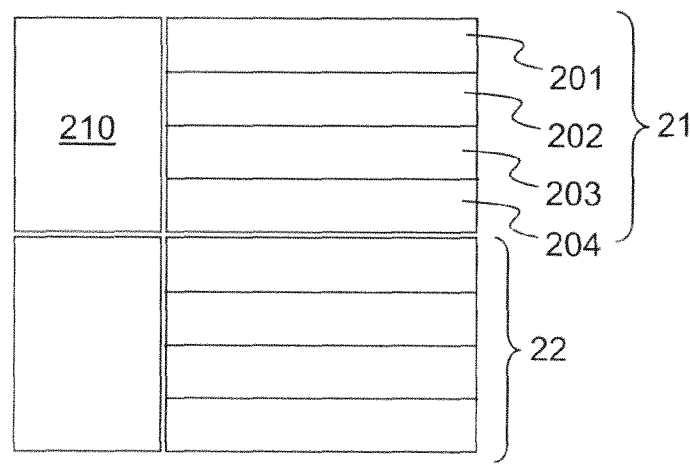
FIG. 2, a diagram representing an atomic counting module used in the device according to the invention.

FIG. 2 represents an atomic counting module used in the device according to the invention. The counting module comprises a set of counters, each counter being installed in the form of a register preferably accessible via a dedicated software interface. Each register comprises at least one "value" field able to record a counting value as well as another field making it possible to read and to modify the counting value, for example a "post-increment" field.

In the example of FIG. 2, each register 21, 22 (also called a counter) included in the counting module is assigned an identifier 210 and comprises four fields:

- a "value" field 201; read-access to this field returns the value recorded without any onboard effect, stated otherwise, without modifying it;
- a "post-increment" field 202; read-access to this field returns the value of the register and increments it automatically and in an atomic manner, that is to say no other operation can take place on this counter between the reading of the "value" field and its incrementation by access to the "post-increment" field;
- a "post-decrement" field 203; read-access to this field returns the value of the register and decrements it automatically and in an atomic manner, that is to say no other operation can take place on this counter between the reading of the "value" field and its decrementation by access to the "post-decrement" field;
- a "control" field 204 making it possible to configure an upper bound and a lower bound to the value field; a write-access to the "control" field makes it possible to activate or to deactivate (according to the state of this field) an operating mode with bounds, an upper bound being able to be defined by writing to the post-incrementation field and a lower bound being able to be defined by writing to the post-decrementation field. The defining of bounds makes it possible notably to prevent the "value" field from taking a false value and is interpreted as signifying that the resource is free. It also makes it possible to create various types of synchronization mechanisms (simple mutex or semaphore, for example). A binary semaphore (0 or 1) can thus be effected readily by virtue of a fixing of bounds.

Advantageously, a software interface (API for "Application Programming Interface") makes it possible to access the registers in read and write mode, so as to facilitate the programming of the synchronization means.

Figure 1:
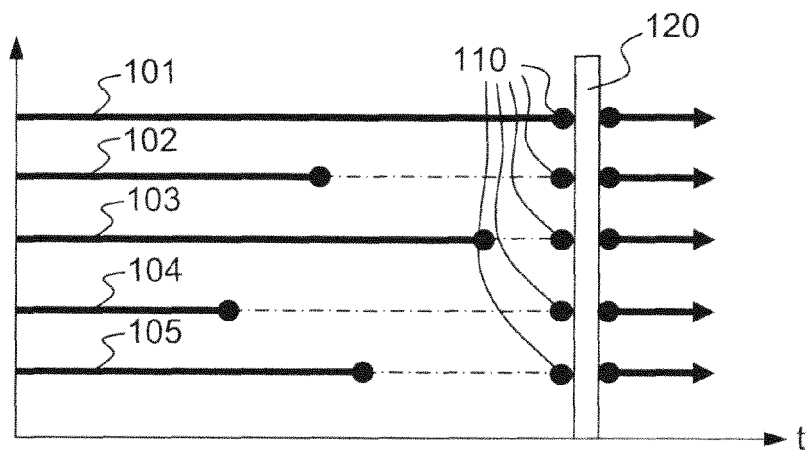
FIG. 1, a diagram illustrating the synchronization barrier principle, this figure having already been presented above.
Figure 3:
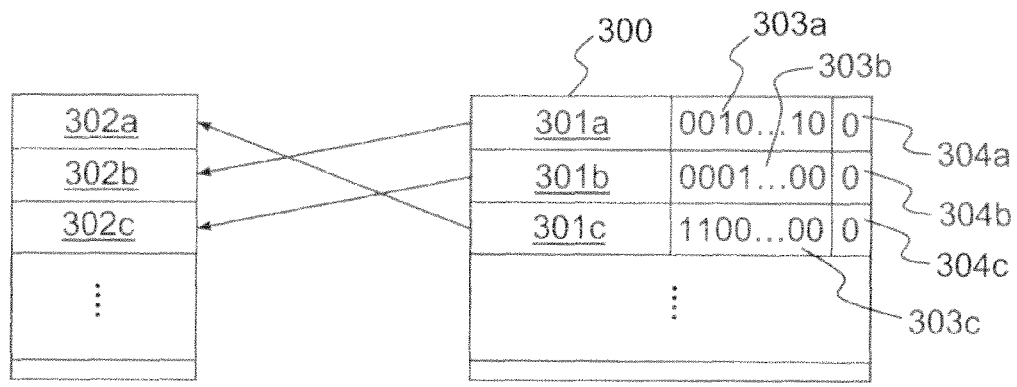
FIG. 3, a diagram representing the interactions between the atomic counting module of FIG. 1 and a notification module.

FIG. 3 represents the interactions between the atomic counting module of FIG. 1 and a notification module used in a device according to the invention.

The notification module associates with each counter of the counting module, a reconfigurable register allowing the tasks to register with the module so as to be warned of the fulfillment of a prerecorded condition. The signaling is done by way of an asynchronous signal dispatched to the associated computation unit (when the task has an associated computation unit).

The notification module records correspondences between an atomic counter, for example such as defined above with regard to FIG. 2, and a condition to be satisfied regarding the value of this counter. This condition can be defined with respect to a given value, for example zero. Thus the condition can be, for example "the value of the counter is equal to zero", other operators being able to be used in place of the equality operator, for example "smaller", "greater", "smaller or equal", "greater or equal".

In the example, the condition is furthermore associated with at least one field, denoted CORE_SET, able to record one or more identifiers of computation units. This field makes it possible to specify the computation units on which are executed tasks having to be notified when the condition is satisfied. Given that a single task is executed at a given instant on a given computation unit, the identifier of the computation unit allows it alone to retrieve the task to be notified which is executed on this computation unit.

Figure 4:
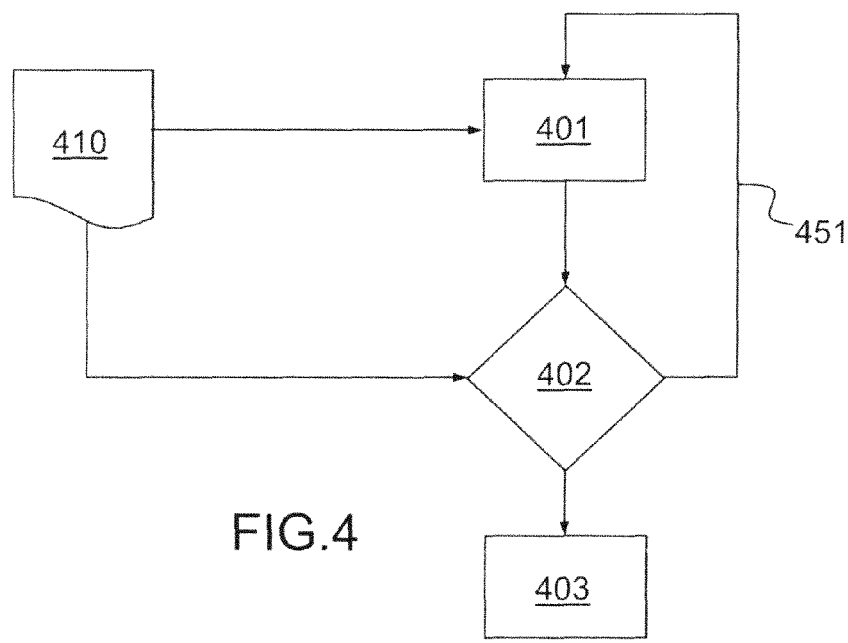
FIG. 4, a schematic illustrating a mode of selection of a computation unit for the execution of the software function responsible for the updating of the state of the preempted tasks.

The notification module 300 is able to record a set of conditions 301a, 301b, 301c, each of these conditions being able to be associated with an atomic counter 302a, 302b, 302c. The CORE_SET field 303a, 303b, 303c is, in the example, interpreted as a series of bits where each bit corresponds to a different computation unit, the value "1" being allotted to a bit to signify that the computation unit has to be notified in the case of fulfillment of the corresponding condition 301a, 301b, 301c. In the example, a preemption indicator 304a, 304b, 304c, described further on with regard to FIG. 4, is also associated with each condition 301a, 301b, 301c.

According to another embodiment of the device according to the invention, the condition is associated with a field that records identifiers of tasks to be notified, the computation units executing these tasks being retrieved by virtue of one or more tables maintained by the operating system to store the correspondences between tasks and computation units.

Advantageously, the condition is also associated with a PENDING field and an EVT_ID field. The PENDING field specifies whether one or more tasks which are waiting for the fulfillment of a condition have been preempted. The EVT_ID field specifies the identifier of the event used to notify the relevant tasks when the condition is satisfied.

Preferably, the use of the notification module is facilitated by two software functions. A first function, for example denoted MN_SET( ), makes it possible to define a condition to be satisfied and a second function, for example denoted MN_UPDATE( ), allows a task to register with the condition created previously. In the example, the function MN_SET( ) is executed during the creation of a synchronization tool, such as a synchronization barrier, for example. This function takes as input parameters, an atomic counter identifier, a condition to be satisfied regarding this atomic counter, and an event identifier EVT_ID, the set CORE_SET of computation units to be notified being initialized to the empty set. The function MN_UPDATE( ) is executed during the execution of a task, notably to update the CORE_SET and PENDING fields, and thus specify which computation unit or task must be notified upon satisfaction of the condition. In the example, this function takes as input parameters, the atomic counter identifier and the identifier of the computation unit on which the task is executed. Advantageously, the function MN_UPDATE also takes a parameter defining the type of updating operation to be performed on the PENDING field when a task is preempted while on standby awaiting the satisfaction of a condition.

In the example, the notification module implements a first hardware module for recording conditions to be satisfied, the module being called CS subsequently, with reference to the expression "Condition Storage" and a second hardware module for detecting the fulfillment of a condition, designated subsequently by the initials CC, for "Condition Checking".

The module CS makes it possible to create an association between an atomic counter and a condition to be satisfied so as to signal the fulfillment of the condition to one or more tasks. In the example, this module CS is activated by the function MN_SET( ) to write to memory a correspondence between a counter and a condition, and then by the function MN_UPDATE( ) to associate one or more computation units or tasks with this condition.

The module CC makes it possible to detect a condition achieved, so as to signal the fulfillment of the condition to the task or tasks for which this condition is relevant. The module CC polls the atomic counters locally and permanently. As soon as the value of one of the counters is modified, and if a condition is associated with this counter, the module CC determines whether the modified value satisfies the associated condition. If this condition is satisfied, then an event is generated by the notification module, stated otherwise, an asynchronous signal is transmitted to the computation units referenced in the CORE_SET field.

The notification module such as described hereinabove operates correctly in a static environment, that is to say on a system in which a task that has begun its execution on a computation unit may not be interrupted by the execution of another task on this same computation unit. Indeed, in the case of operation in static mode, the correspondence between computation units and tasks is invariant during the execution of the tasks; the execution of the tasks is sequential, on each of the computation units. In a dynamic system, where the tasks can be preempted at any moment, the relationship between the set of executed tasks and the set of computation units which execute them is apt to change at any moment. Thus, the additional indicator PENDING must be associated with the condition to be satisfied in order to avoid lost notifications. This preemption indicator makes it possible to specify whether at least one task on standby awaiting fulfillment of a condition has been preempted. When the preemption indicator is set to a first value, for example "zero" or "deactivated", this signifies that none of the tasks on standby awaiting fulfillment of the condition has been preempted. If conversely, the indicator is set, for example to the value "one" or "activated", this signifies that at least one task has been preempted and, either placed on standby by the operating system, or moved to another computation unit. The CORE_SET field or fields corresponding to the computation units on which the preempted tasks were executed then become obsolete since their state no longer corresponds to the tasks to be notified.

Thus, when a task on standby awaiting the fulfillment of a condition is preempted, then the notification requests, recorded in the example in the form of the CORE_SET field, are deactivated and the preemption indicator corresponding to the awaited condition is activated. Likewise, if several conditions are on standby awaiting fulfillment by one and the same task, then each of the CORE_SET fields corresponding to these conditions is reinitialized and all the preemption indicators corresponding to these same conditions are activated. Furthermore, if several tasks are on standby awaiting the fulfillment of one and the same condition, and if a single one of these tasks is preempted, then the preemption indicator is activated.

When the preemption indicator is activated, then the tasks on standby awaiting a condition can be retrieved via a dynamic allocation module, described with regard to FIG. 4.

A function for updating the state of the tasks on standby awaiting fulfillment of a condition is implemented. This function searches for said tasks (notably those which have been preempted) and signals to them the fulfillment of the associated condition. For example, for each computation unit, a hardware-installed message queue is implemented specifically to generate an interrupt and launch the execution of the function for updating the state of the tasks. This message queue is subsequently called a "hardware queue". According to another embodiment, only some of the computation units are selectable to execute the search and notification function. In this case, only these selectable computation units employ a hardware queue dedicated to the notification of the tasks on standby awaiting fulfillment of a condition.

When a condition is fulfilled, the dynamic allocation module triggers the execution of an interrupt to execute the system function making it possible to retrieve and update the state of the tasks on standby awaiting the fulfillment of said condition. This system function makes it possible to notify preempted tasks or tasks migrated to other computation units of the fulfillment of the condition whose fulfillment they are awaiting. This system function is executed on a computation unit chosen by the dynamic allocation module, as a function of the priorities recorded in the list of correspondences between computation units and priorities.

By way of illustration, the priorities can notably be determined as a function of the operating state of the computation units, of the degree of fill of the hardware queues, or of priorities assigned a priori to each of the computation units. Thus, for example, as soon as a computation unit becomes defective, a field of the dynamic allocation module is updated to signify that this computation unit has a lower allotted priority. Likewise, when a standby hardware queue associated with a computation unit is empty, this signifies that the computation unit is quiescent and that consequently, the computation unit can be assigned a greater priority than those whose associated hardware queue is non-empty. It should be noted that the priority level allotted to each computation unit is preferably accessible to the operating system, so that the latter can benefit from the information maintained by the dynamic allocation module to dynamically allocate a task to a computation unit. In the example, the operating system is configured to regularly update a list recorded by the dynamic allocations hardware module, this list comprising correspondences between computation units and priorities, each computation unit being assigned a priority.

According to another embodiment, the dynamic allocation module triggers the execution of the software function for updating the state of the tasks (stated otherwise, for searching for and notifying the tasks) by choosing a computation unit randomly from among the computation units of the platform.

In the example, the function for updating the state of the tasks takes as parameter the identifier of the atomic counter on which the condition is fulfilled. This function executes the following steps:
  searching for the tasks which are awaiting the fulfillment of the aforementioned condition; accordingly, a table of correspondences between the identifiers of atomic counters, the synchronization structures implemented (that is to say the data structures created during the creation of the synchronization primitives such as a semaphore, for example) and the relevant tasks is maintained by the operating system (sometimes, the operating system is also called a "software system" in onboard systems);
  signaling to the task or to the tasks on standby awaiting the fulfillment of the condition; advantageously, the function for updating the tasks takes as parameter the type of event to be transmitted to the task or to the tasks on standby.

Figure 5:
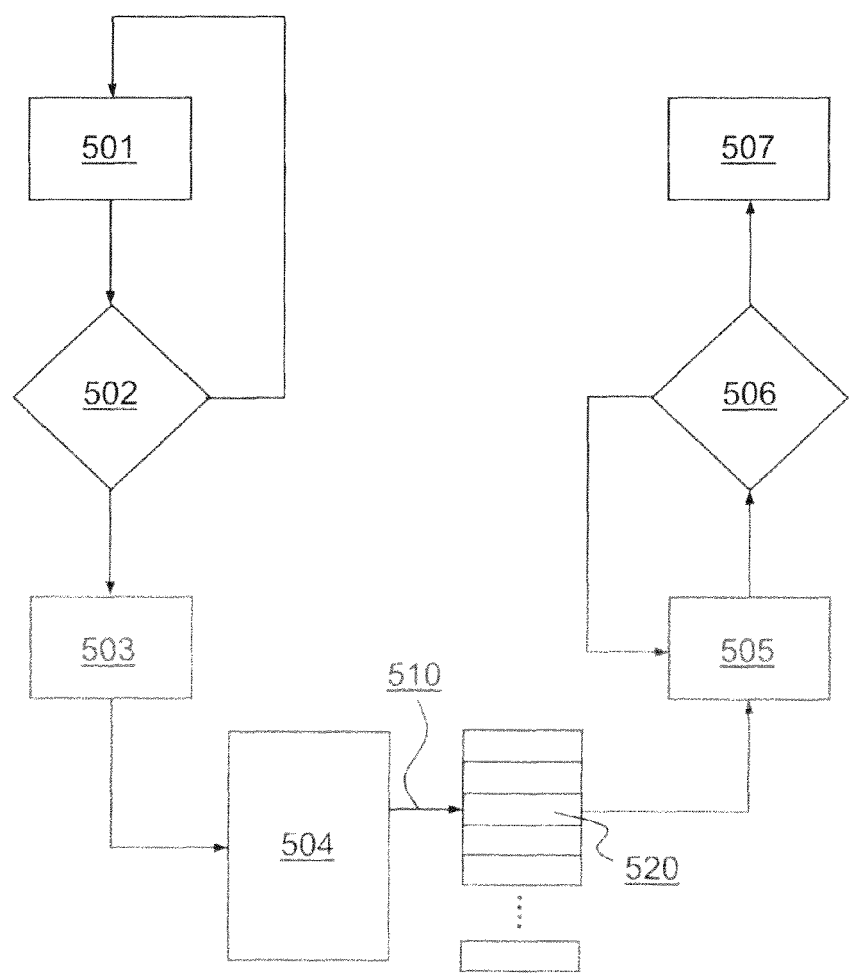
FIG. 5, a schematic illustrating a hardware message queue used by the dynamic allocator of tasks according to the invention, to communicate with the operating system.

In the example, the dynamic allocations module uses a hardware queue of messages, which is described with regard to FIG. 5, and which can be accessed by the operating system so as to transmit a message for assigning the function for updating the state of the tasks to the system.

FIG. 4 illustrates a mode of selection of a computation unit for the execution of the software function responsible for the updating of the state of the preempted tasks. Initially, the dynamic allocator performs a sorting 401 of the computation units as a function of data 410 such as the operating state of the computation units, of the degree of fill of the hardware queues associated with each computation unit, or of priorities assigned a priori to each of the computation units. Thereafter, a test 402 is executed to determine which computation unit is the most available to execute a function for updating the state of the tasks. It should be noted that between the first sorting step 401 and the second test step 402, a computation unit may have changed state and become defective. Hence, the data 410 are preferably used also during the second step 402. If no computation unit is available, then the method returns 451 to the first step 401 of sorting the computation units. If a computation unit is available 403, then a message is written to a hardware queue associated with the computation unit and an interrupt is generated so as to launch the execution of the function for updating the state of the tasks. This step is illustrated in FIG. 5.

FIG. 5 illustrates, via a schematic, the operation of a messages-based notification module used by the module for dynamically allocating tasks.

Initially 501, a computation unit is chosen (cf. FIG. 4) and access is requested to the queue of messages of the chosen computation unit. A semaphore protecting the queue of messages against concurrent accesses is tested 502 to know whether write-access to the queue is authorized. If access is authorized, then a message is written 503 to the queue of messages, the message comprising the identifier of the counter on which the condition is defined and the type of event to be transmitted to the computation task or tasks to be notified.

After the message has been written to the queue of messages, the interrupts manager 504 generates an interrupt 510 to the previously chosen computation unit 520. This computation unit 520 read-accesses 505 the message queue so as to recover its content. If the queue contains several messages, several successive reads are carried out. Once the queue is empty, the message or messages read 507 are processed and the software function for updating the tasks is executed with the parameters contained in the message or messages.

According to another embodiment, the dynamic allocations module does not use any queue of messages and the system comprises a particular interrupt line associated with the sending of a synchronization event. Thus, as soon as a condition is fulfilled, the system function for updating the tasks on standby awaiting this condition is executed on the computation unit chosen by the dynamic allocation module, the task previously being executed on this computation unit (if the computation unit was not free) being placed on standby.

The set formed by the counting module, the notification module and the dynamic allocations module can be used in a multi-core platform in the form of a programmable circuit of FPGA ("Field-Programmable Gate Array") type or of an integrated circuit of ASIC ("Application Specific Integrated Circuit") type, for example. A software driver can be integrated into the platform's system software, in such a way as to establish an interface between this circuit and the operating system (runtime), in such a way as for example to be able to execute the functions MN_SET( ) and MN_UP-DATE( ) so as to benefit from the hardware support provided by this device.

The advantage of the device according to the invention is notably that it constitutes a judicious compromise between a purely hardware approach and a purely software approach in the management of the means for synchronizing tasks. Indeed, with the use of a small silicon area, the device makes it possible to considerably unburden the other facilities of the platform of the unwieldy management of the synchronization between tasks. Managing the awaiting of events, which conventionally is very penalizing to the performance of a multi-task system, is managed by hardware means that are sufficiently reduced as not to occupy too significant a space on the circuit.

The device according to the invention can notably be employed in multi-core mobile communications terminals or more generally in multi-processor onboard platforms, the latter having fairly severe constraints on available space and execution time.

The invention claimed is:

1. A device for synchronizing tasks executed in parallel on a platform comprising several computation units, the tasks being configured to be preempted by an operating system of the platform, the device comprising:
   at least one register and a recording module which are installed in a form of circuits on the platform, the recording module being configured to store a relationship between a condition to be satisfied on a value recorded by one of the registers and one or more computation tasks configured to be executed in parallel;
   a dynamic allocation module installed in the form of circuits on the platform and configured to choose a computation unit from among the computation units of the platform when the condition is fulfilled, to execute on a chosen computation unit a software function for searching for the tasks on standby awaiting fulfillment of the condition, and to notify the tasks; and
   a notification module configured to detect the fulfillment of the condition and to signal the fulfillment of the condition to preempted tasks in relation to the condition when the fulfillment of the condition is detected, wherein the signaling comprises sending an asynchronous signal to the computation units executing the preempted tasks on standby awaiting the condition, the asynchronous signal being sent to the computation units by means of a lookup table of correspondence between computation units and conditions, this lookup table being updated continuously by the operating system of the platform.

2. The device for synchronizing tasks as claimed in claim 1, in which the register supports atomic operations of post-incrementation and/or of post-decrementation, configured to read the value recorded by the register and then for modifying it within one and the same atomic operation during read-access to a memory slot, related to the register.

3. A method for synchronizing tasks executed in parallel on a platform comprising several computation units and a hardware synchronization device comprising:
   at least one register and one dynamic allocation module;
   a task on standby awaiting satisfaction of a condition being preempted by an operating system of the platform, wherein when the condition is fulfilled, the dynamic allocation module chooses a computation unit to execute a software function configured to search for the tasks on standby awaiting fulfillment of the condition and to notify the tasks; and
   a notification module configured to detect the fulfillment of the condition and to signal the fulfillment of the condition to preempted tasks in relation to the condition when the fulfillment of the condition is detected, wherein the signaling comprises sending an asynchronous signal to the computation unit executing the preempted tasks on standby awaiting the condition, the asynchronous signal being sent to the computation unit via a lookup table of correspondence between computation units and conditions, this lookup table being updated continuously by the operating system of the platform.

4. The method for synchronizing tasks as claimed in claim 3, in which the dynamic allocation module is configured to choose the computation unit as a function of at least one criterion from among the following: a computation load allotted to each of the computation units of the platform, an operating state of each of the computation units of the platform, a priority level allotted a priori to each of the computation units of the platform.

5. The method for synchronizing tasks as claimed in claim 4, in which, when a condition is fulfilled, the dynamic allocation module causes an interrupt on the computation unit chosen to execute the software function for searching for and for updating a state of the tasks.

6. The method for synchronizing tasks as claimed in claim 4, in which the dynamic allocation module transmits, as input parameter of the software function, a datum making it possible to identify the register on which the fulfilled condition is defined.

7. The method for synchronizing tasks as claimed in claim 4, in which, when a task is preempted, a preemption indicator is activated for the condition or conditions whose fulfillment is awaited by the task, the dynamic allocation module being activated when the preemption indicator is activated and when the condition is fulfilled.

8. The method for synchronizing tasks as claimed in claim 3, in which, when a condition is fulfilled, the dynamic allocation module causes an interrupt on the computation unit chosen to execute the software function for searching for and for updating an state of the tasks.

9. The method for synchronizing tasks as claimed in claim 8, in which the dynamic allocation module transmits, as input parameter of the software function, a datum making it possible to identify the register on which the fulfilled condition is defined.

10. The method for synchronizing tasks as claimed in claim 8, in which, when a task is preempted, a preemption indicator is activated for the condition or conditions whose fulfillment is awaited by the task, the dynamic allocation module being activated when the preemption indicator is activated and when the condition is fulfilled.

11. The method for synchronizing tasks as claimed in claim 3, in which the dynamic allocation module transmits, as input parameter of the software function, a datum making it possible to identify the register on which the fulfilled condition is defined.

12. The method for synchronizing tasks as claimed in claim 3, in which, when a task is preempted, a preemption indicator is activated for the condition or conditions whose fulfillment is awaited by the task, the dynamic allocation module being activated when the preemption indicator is activated and when the condition is fulfilled.

13. The method for synchronizing tasks as claimed in claim 12, in which, when a task resumes its execution on a computation unit, the preemption indicator is deactivated if there no longer exists any preempted task associated with the condition.

14. The method for synchronizing tasks as claimed in claim 12, in which, when a task is preempted, a preemption indicator is activated for the condition or conditions whose fulfillment is awaited by the task, the dynamic allocation module being activated when the preemption indicator is activated and when the condition is fulfilled.

15. The synchronization method as claimed in claim 3, wherein modifying a value of the register comprises modifying the value of the register when a resource is freed by the task.

16. The synchronization method as claimed in claim 3, comprising a step of recording the relationship between the condition to be satisfied and the computation units during the execution of a task comprising a phase of awaiting an asynchronous signal.

\* \* \* \* \*